Dec. 11, 1962 F. W. HOLST 3,067,634
HAND AND CIRCULAR SAW SETTING TOOL
Filed June 27, 1960 3 Sheets-Sheet 1
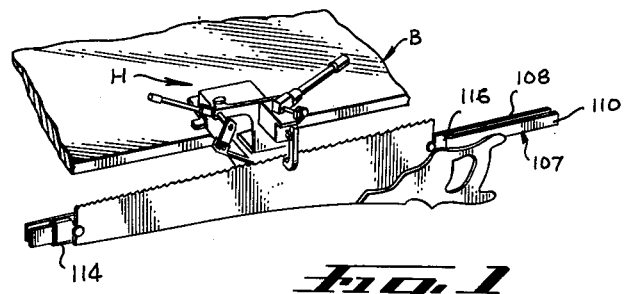
Fig. 1
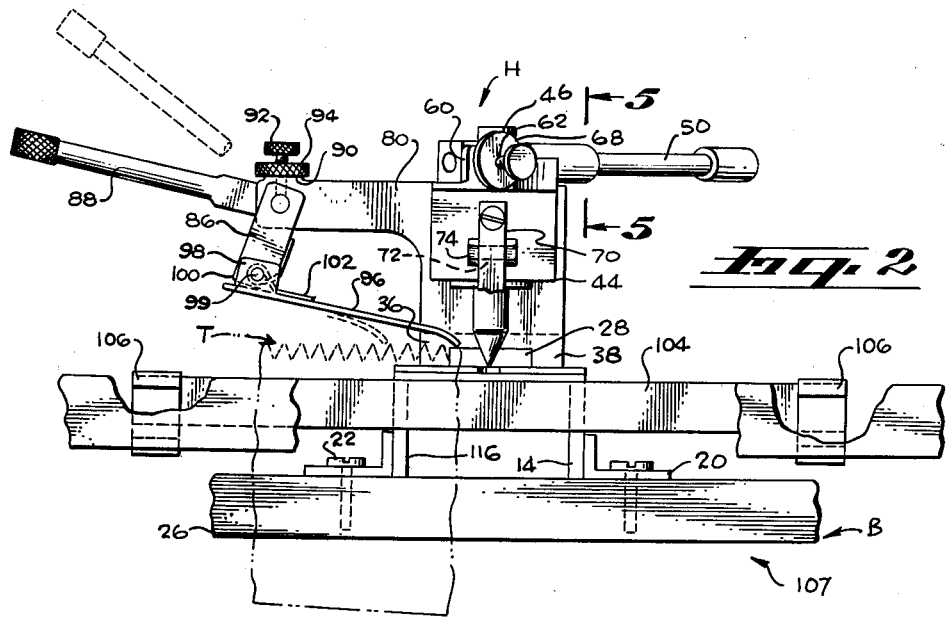
Fig. 2
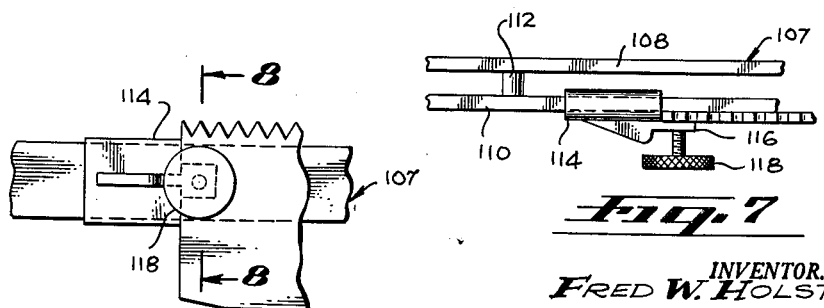
Fig. 6
Fig. 7
INVENTOR.
FRED W. HOLST
BY
FULWIDER, MATTINGLY
& HUNTLEY
ATTORNEYS

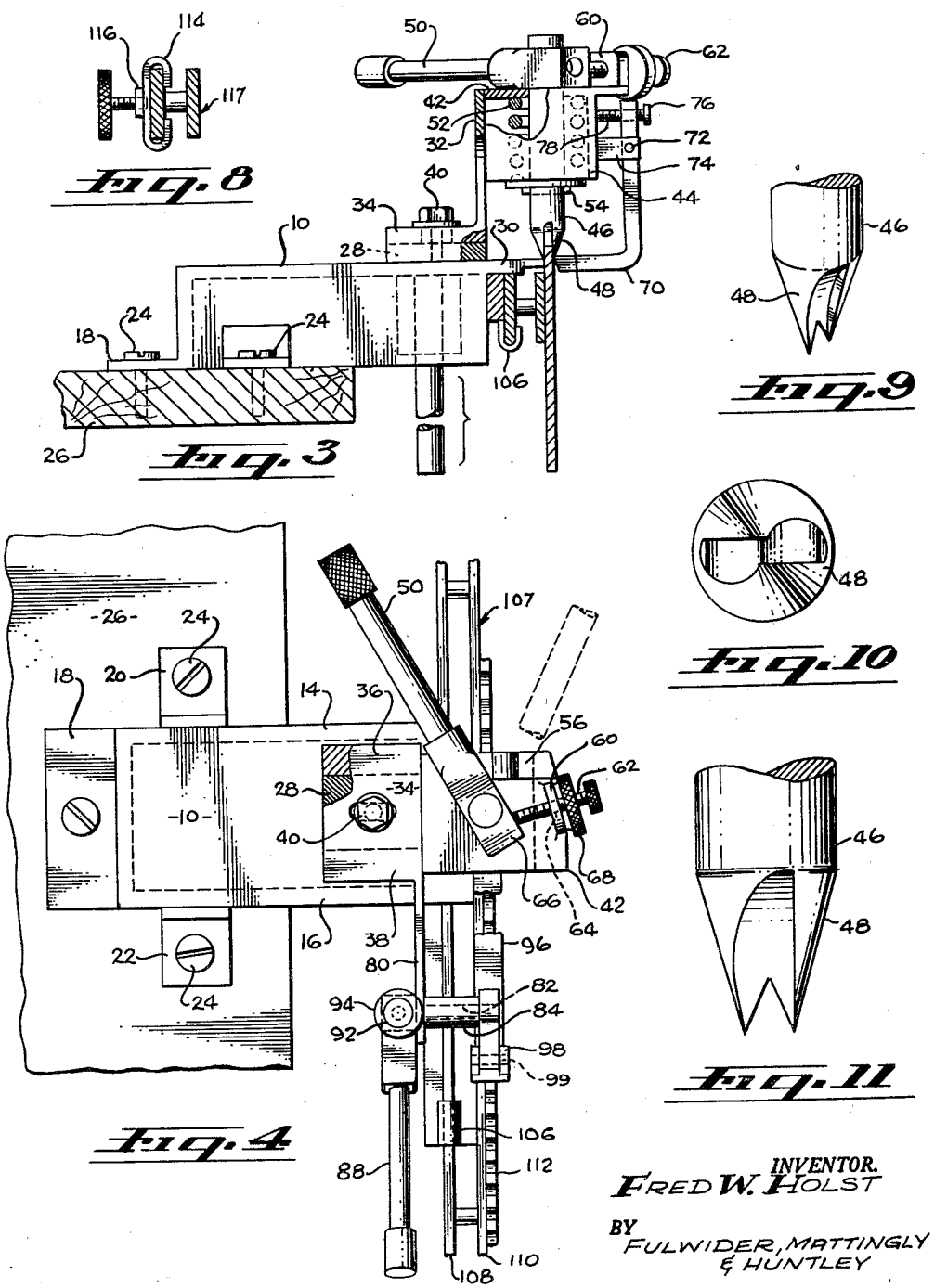

Dec. 11, 1962   F. W. HOLST   3,067,634
HAND AND CIRCULAR SAW SETTING TOOL
Filed June 27, 1960   3 Sheets-Sheet 3
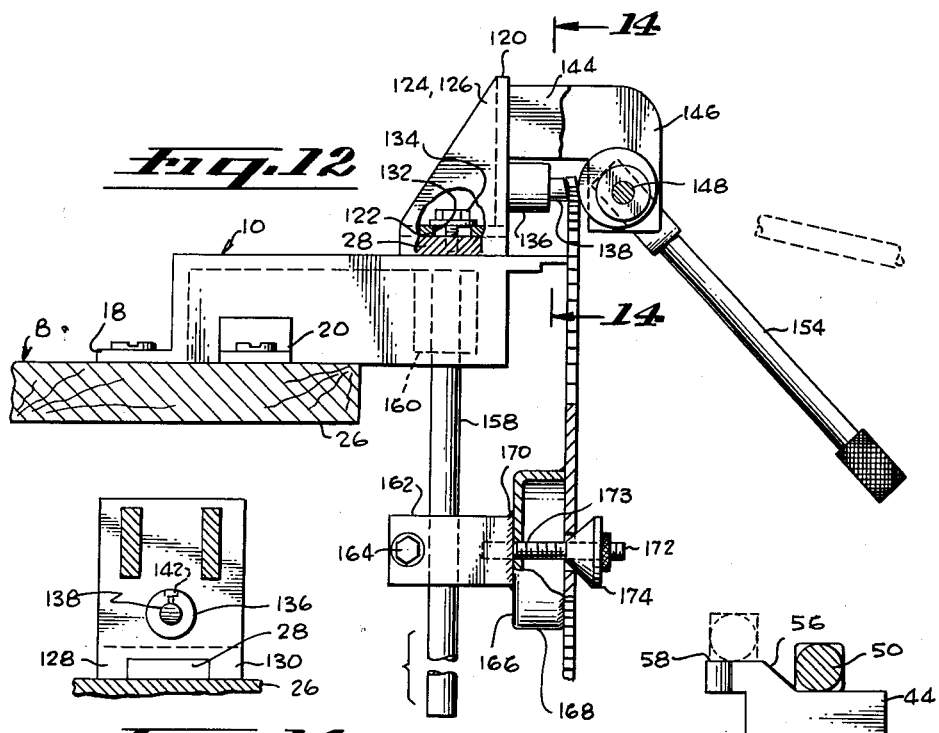
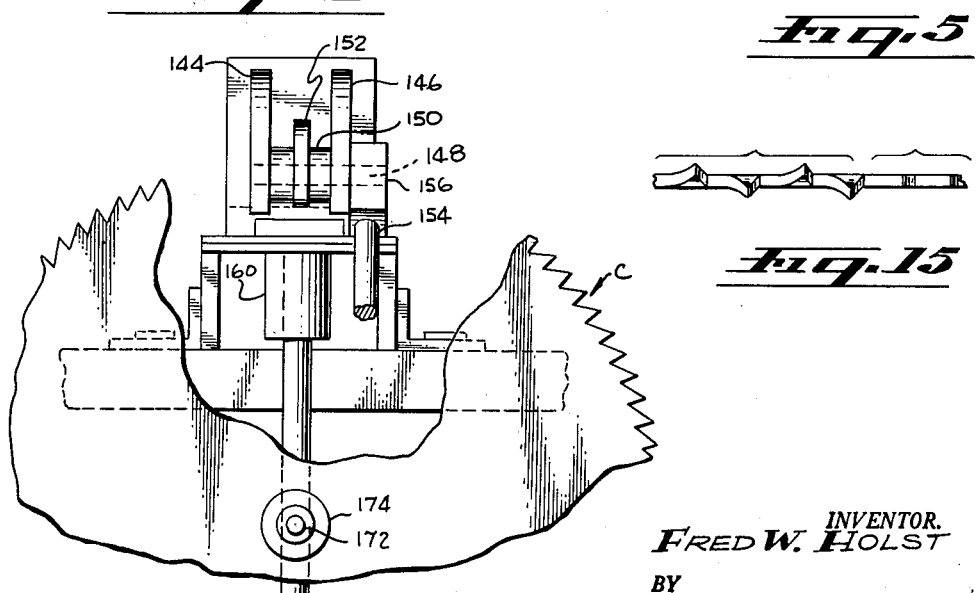
INVENTOR.
FRED W. HOLST
BY FULWIDER, MATTINGLY & HUNTLEY
ATTORNEYS

United States Patent Office 3,067,634
Patented Dec. 11, 1962

3,067,634
HAND AND CIRCULAR SAW SETTING TOOL
Fred W. Holst, 3111 Cricklewood Ave., Torrance, Calif.
Filed June 27, 1960, Ser. No. 39,127
5 Claims. (Cl. 76—63)

This invention relates generally to saw setting devices and particularly to hand and circular saw setting tools detachably mounted on the same base.

One of the main objects of the invention is to provide a combined hand and circular saw setting device that permits operation from a single base member.

Another object of the invention is in the provision of a specially designed base member that detachably supports either a hand or circular saw setting tool.

Still another object of the invention is to provide a hand saw setting device that has the setting die and teeth advancing ratchet mechanism disposed in such manner that the setting operation is quickly and easily accomplished.

Yet another object of the invention resides in the positioning of the hand saw setting die over the carriage and adjacent the easily operated mechanism for advancing the saw teeth.

A further object of the invention is in the provision of a circular saw setting device that is attachable on and operable with the same base that detachably supports the hand saw set.

A still further object of the invention is in the manner of supporting a circular saw on the hand saw base whereby the saw teeth are movable between the die and rollered cam of the circular saw setting tool attached to the hand saw base.

With the foregoing objects in view, and such other objects and advantages as will become apparent to those skilled in the art to which this invention relates as this specification proceeds, the invention consists essentially in the arrangement and construction of parts all as hereinafter more particularly described, reference being had to the accompanying drawings in which:

FIGURE 1 is a perspective view of the hand saw setting device and carriage supported saw;

FIGURE 2 is a front elevational view of the hand saw setting device;

FIGURE 3 is an end elevational view partially in section of the hand saw set;

FIGURE 4 is a plan view of the hand saw setting apparatus;

FIGURE 5 is a sectional view taken on the line 5—5 of FIGURE 2;

FIGURE 6 is a front elevational view of the hand saw carriage saw attachment means;

FIGURE 7 is a plan view of the carriage saw attachment means;

FIGURE 8 is a sectional view taken on the line 8—8 of FIGURE 6;

FIGURE 9 is a perspective view of the hand saw setting die;

FIGURE 10 is a plan view from below of the hand setting die;

FIGURE 11 is an elevational view of the hand setting die;

FIGURE 12 is an end elevational view partially in section of the circular saw setting device;

FIGURE 13 is a front elevational view of the circular saw set;

FIGURE 14 is a sectional view taken on the line 14—14 of FIGURE 12; and

FIGURE 15 is a plan view of the saw teeth before and after the setting operation.

The embodiment of the invention as shown herein contemplates the operation of a hand saw set and a circular saw setting tool from a single base upon which they are both detachably connected.

The base generally referred to as B may be detachably connected to a work bench or any convenient support. The hand saw setting tool generally referred to as H has a detachable connection with the base. The hand saw set includes a saw supporting frame upon which a movable carriage is hung for lateral movement under the setting die. The carriage has adjustable securement means for the ends of the hand saw. The setting tool which is disposed over the frame and carriage has a vertically disposed die with bifurcated cammed tooth setting jaws that are moved manually into engagement with adjacent teeth and rotated to bend them to desired set. The die is then manually withdrawn and raised by cam action to an elevated position. The amount of die rotation and degree of set is controlled by an adjustable stop. An adjustable tensioning means on the tool head holds the hand saw securely in the frame under the die.

A manually operated tensioned ratchet is brought into engagement with the saw teeth ahead of the die and a ratchet handle actuated to advance adjacent teeth in position beneath the die. An adjustable stop is provided to control the amount of teeth advancement depending on the size thereof. The saw teeth are set in a single advancing operation of the tool.

When desired, the hand saw setting is detached from the base B and a circular saw setting device, generally referred to as C, is connected to the base. The base B has a depending rod upon which a circular saw attachment member is adjustably mounted in a manner to move the saw teeth to desired position between the die portions. The attachment member holds the circular saw in fixed vertical position but permits manual rotation so that alternate teeth may be set. The circular saw setting tool head has supported therein an adjustable laterally disposed die with a slanted face upon which the saw teeth are bent to controlled degree by a handle actuated roller having a cam engaging the opposite side of the saw teeth. When alternate teeth on one side of the saw have been set, the circular saw is reversed in the attachment member and the alternate teeth on the other side are set in the same manner.

The structure of the hand and circular saw sets is relatively uncomplicated and their availability for use on a single specially designed base is entirely novel and results in an easily operated dual type of tool.

The hand saw setting device H and the circular saw setting apparatus C are both capable of detachable connection on a base plate or member 10 that has downwardly extending flanged sides 14 and 16 and a tail attachment piece 18. Laterally extending ears 20 and 22 also provide attachment means for the base 10. Plural screws 24 secure the tail piece 18 and the ears 20 and 22 to a bench or support 26. A slightly elevated flat rectangular plate 28 is welded to the upper surface of the base plate 10. The upper forward edge 30 of the base plate 10 extends substantially beyond the outer edges of the flanged sides 14 and 16.

The hand saw setting apparatus H includes a vertically disposed back 32 that has a rearwardly extending horizontally disposed attachment plate 34 with downwardly projecting flanged sides 36 and 38. The rectangular plate 28 on base member 10 slidably receives the flanges attachment plate 34. A bolt 40 is threadedly connected to the attachment plate 34 and the elevated rectangular plate 28 on the base 10. A quick detachable connection is thus provided between the base 10 and the hand saw set H.

A forward projection or top 42 extending from the back 32 and an apertured box 44 are welded together to form a die supporting head. The hand saw setting die comprises a tubular shaft 46 and a bifurcated jawed and cammed die 48. The upper end of the shaft 46 projects through the top 42 and is fixedly connected to a laterally disposed die handle 50. In FIGURE 3, the die shaft 46 is shown with a coil spring support at 52 within the box 44. A collar 54 pinned to the shaft 46 and engaging the bottom of the apertured box 44 completes the tensioned die mounting. A cam 56 having a flat surface 58 on the top 42 engages the die handle 50 when rotated thereagainst and thus raises the handle and die shaft to an elevated position with the jaws of the die out of engagement with the saw teeth. The position of the die handle 50 at that time is shown in dotted lines in FIGURE 4. An upwardly projecting lug 60 on the top 42 has a stop screw 62 threaded therethrough at 64. The stop screw 62 adjustably engages an extension 66 on the die handle 50 and controls the rotational movement of the die and therefore the degree of set of the saw teeth. A knurled collar 68 threaded on the stop screw 62 secures it in desired position in the lug 60.

A saw tensioning means includes a lever 70 pivoted at 72 in a bifurcated bracket 74. A screw 76 threaded at 78 in the upper end of the lever 70 engages the box 44 in a manner to adjustably control lower end lever tension and fixed engagement with the hand saw.

As shown in FIGURE 2, the back 32 has a lateral extension 80 that provides a support for a ratchet saw teeth advancing means. A bored hub 82 integrally connected to the extension 80 supports a shaft 84 that is fixedly connected to a lever 86 on its outer end. The inner end of the shaft 84 is secured to a ratchet handle 88 and thus provides the pivot for the handle 88 and the ratchet lever 86. A lug 90 projecting from the extension 80 has a screw 92 adjustably threaded therein. The screw 92 provides an adjustable stop and thus control of lever 86 movement. A threaded setting collar 94 on the screw 92 secures it in desired locked position in the lug 90. A saw tooth engaging ratchet 96 has a bifurcated bracket 98 welded to its outer end. A pivot pin 99 connects the bracket 98 and the apertured lower end 100 of the lever 86. A flat spring 102 connecting the ratchet 96 and lever 86 applies constant downward pressure on the ratchet. Manual movement of the handle 88 to the dotted line position shown in FIGURE 2 automatically engages the ratchet 96 with the saw teeth generally referred to as T.

A saw carriage supporting frame includes a horizontally disposed bar 104 that is welded to the outer ends of the base plate flanges 14 and 16. As shown in FIGURE 2, the outer ends of the bar 104 have carriage supporting upper and lower spaced curved grips 106. The saw supporting carriage, generally referred to as 107, comprises two narrow metal strips 108 and 110 that are sustained in spaced fixed position by means of several connecting pins 112. The carriage is detachable from the gripping or supporting bar 104 in that the inner strip 108 is slidably received in the grips on the bar 104. The ends of the hand saw are adjustably secured to the carriage by means of clamps 114 slidable on the outer strip 110. The inner edges of the clamps 114 engage the ends of the saw but a projecting portion 116 has an attachment screw 118 threaded therein for engagement with and securement of the saw ends against the metal strip 110. The clamps 114 can be moved to support any size of saw.

The operation of the hand saw setting apparatus is relatively simple. The hand saw of any size is clamped to the carriage and moved to teeth setting position beneath the setting die. The setting die is handle actuated from an elevated position into engagement with adjacent teeth on the saw and then rotated slightly to bend the teeth sidewardly as shown in FIGURE 15. The degree of set is determined by the degree of rotation of the setting die against the adjustable stop. When the adjacent teeth have been set, the die is manually elevated to position on the flat face of the cam and sustained there. The operator then moves the spring tensioned ratchet into engagement with the saw teeth and manually actuates the ratchet lever to advance two teeth beneath the elevated die. The setting operation then continues. The saw is held in tensioned fixed position by the adjustable lever.

The circular saw setting device generally referred to as C has a supporting head or bracket that includes a vertically disposed back 120, a bottom 122 and connecting sloping sides 124 and 126. The bottom 122 has depending engaging flanges 128 and 130 that are detachable on the elevated rectangular plate 28 on base 10. A slotted aperture 132 in the bottom 122 receives the attachment screw 134 that detachably secures the circular saw setting device on the single base 10. A bored hub 136 integrally connected to the back 120 slidably receives the circular saw setting die shaft 138. The setting die surface on the outer end of the shaft 138 is sloped in a manner to permit the saw teeth to be bent thereon. A set screw 142 adjustably secures the die shaft 138 in the bored hub 136. Outwardly projecting bifurcated bracket members 144 and 146 are apertured to receive in pivotal relation the outer ends of a pin 148. The pin 148 has an integral hub 150 upon which is secured a roller cam 152 that is adapted to engage the side of a saw tooth and bend it upon the die surface. A die actuating handle 154 is fixedly connected to a projecting end 156 of the pin 148.

The circular saw supporting and adjusting means includes a rod or spindle 158 that is fixedly received in a sleeve 160 welded to the underside of the base 10. A split journal 162 is adjustable on the rod 158 by means of the threaded bolt 164. A circular disc 166 flanged outwardly at 168 is welded to the split collar 162 at 170. A threaded pin 172 has its inner end 173 integrated with the disc 166 and split collar 162. A tapered circular saw setting cone 174 is slidable on the bolt 172 and a knurled collar threaded on the bolt 172 forces the setting cone into the central aperture in a circular saw as shown in FIGURE 12. Any size circular saw may be fixedly secured on the flanged disc 166. The tapered cone 174 is adaptable to any size of saw central aperture. The saw support is fixed vertically by rotation of the saw, but rotation of the saw is still permitted so that atlernate teeth can be brought into position under the die.

The operation of the circular saw setting apparatus is relatively simple. The device is obviously capable of quick detachment on the single base 10. The circular saw and teeth are adjustably positioned by movement of the split journal on the rod depending from the single base. The rollered cam bends the alternate circular saw teeth against the die to the desired set. The circular saw is then moved to bring alternate teeth between the die. The amount of set is determined by the degree of elevation of the teeth between the die and rollered cam. The setting operation is then continued. When alternate teeth have been set on one side, the saw is reversed and alternate teeth on the other side set by the same operation.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:
1. A hand saw setting device, comprising: means for supporting a hand saw such that the teeth thereof extend upwardly, a die supporting head above said saw including a substantially horizontal projection formed with an opening, a generally cylindrical setting die pivotally positioned within said opening and formed with a bifurcated lower end portion affording a pair of depending extended portions, spring means operable between said setting die and said projection to bias the bifurcated lower end portion of said die into bridging relation with said saw be- tween adjacent teeth thereof, a handle fixed to said setting die to pivot the same when in said bridging position to cause the extended portion thereof to set the adjacent teeth of said saw in opposite directions, and cam means on said projection cooperable with said handle to lift said setting die free of said saw teeth against the biasing force of said spring means to permit said saw to be repositioned for subsequent setting of other teeth thereof.

2. A hand saw setting device according to claim 1 wherein said handle is operable in reverse directions to effect setting of the saw teeth when moved in one direction and to effect removal of the setting die from engagement with the saw when moved in the other direction.

3. A hand saw setting device according to claim 2 wherein is included limit stop means for limiting the pivotal movement of said die to thereby control the amount of set of said saw teeth.

4. A saw setting device, comprising: means for supporting a saw such that the teeth thereof extend upwardly, a die supporting head above said saw including a substantially horizontal projection formed with an opening, a generally cylindrical setting die pivotally positioned within said opening and formed with a bifurcated lower end portion affording a pair of depending extended portions, spring means operable between said setting die and said projection to bias the bifurcated lower end portion of said die into bridging relation with said saw between adjacent teeth thereof, a handle fixed to said setting die to pivot the same when in said bridging position to cause the extended portions thereof to set the adjacent teeth of said saw in opposite directions, and cam means on said projection cooperable with said handle to lift said setting die free of said saw teeth against the biasing force of said spring means to permit said saw to be repositioned for subsequent setting of other teeth thereof.

5. A saw setting device, comprising: means for supporting a saw, a die supporting head including a projection formed with an opening, a generally cylindrical setting die pivotally positioned within said opening and formed with a bifurcated end portion affording a pair of extended portions, spring means operable between said setting die and said projection to bias the bifurcated end portion of said die into bridging relation with said saw between adjacent teeth thereof, a handle fixed to said setting die to pivot the same when in said bridging position to cause the extended portions thereof to set the adjacent teeth of said saw in opposite directions, and cam means on said projection cooperable with said handle to move said setting die free of said saw teeth against the biasing force of said spring means to permit said saw to be repositioned for subsequent setting of other teeth thereof.

References Cited in the file of this patent

UNITED STATES PATENTS

| | | |
|---|---|---|
| 824,996 | Miller | July 3, 1906 |
| 1,574,032 | Hernes | Feb. 23, 1926 |
| 1,900,083 | Waller | Mar. 7, 1933 |
| 2,336,761 | Upright | Dec. 14, 1943 |
| 2,783,663 | Reisinger | Mar. 5, 1957 |

FOREIGN PATENTS

| | | |
|---|---|---|
| 225,859 | Germany | Sept. 20, 1910 |
| 614,631 | France | Sept. 21, 1926 |
| 964,096 | France | Jan. 18, 1950 |